United States Patent
Chern (10) Patent No.: US 10,814,410 B1
(45) Date of Patent: Oct. 27, 2020

(54) SAW BLADE HAND TOOL STRUCTURE

(71) Applicant: Zheng Kai Hardware Products (Nantong) Co., Ltd., Nantong, Jiangsu Province (CN)

(72) Inventor: Shwu-Ruu Chern, Taichung (TW)

(73) Assignee: ZHENG KAI HARDWARE PRODUCTS (NANTONG) CO., LTD., Nantong, Jiangsu Province (CN)

( * ) Notice: Subject to any disclaimer, the term of this patent is extended or adjusted under 35 U.S.C. 154(b) by 0 days.

(21) Appl. No.: 16/445,056

(22) Filed: Jun. 18, 2019

(51) Int. Cl.
*B23D 51/10* (2006.01)
*B25G 3/26* (2006.01)
*B23D 49/10* (2006.01)
*B23D 51/01* (2006.01)

(52) U.S. Cl.
CPC ............ *B23D 51/10* (2013.01); *B23D 49/10* (2013.01); *B23D 51/01* (2013.01); *B25G 3/26* (2013.01)

(58) Field of Classification Search
CPC ........ B23D 51/10; B23D 51/01; B23D 49/10; B25G 3/26
See application file for complete search history.

(56) References Cited

U.S. PATENT DOCUMENTS

| | | | |
|---|---|---|---|
| 6,851,194 B1* | 2/2005 | Chen | B23D 51/10 279/71 |
| 2004/0012161 A1* | 1/2004 | Chiu | B23D 51/10 279/30 |
| 2004/0194324 A1* | 10/2004 | Youn-Chyuan | B23D 51/10 30/337 |
| 2008/0209742 A1* | 9/2008 | Kretschmar | B23D 51/10 30/392 |
| 2011/0260415 A1* | 10/2011 | Lin | B23D 51/10 279/43 |
| 2013/0193653 A1* | 8/2013 | Marini | B23D 51/10 279/76 |
| 2014/0197609 A1* | 7/2014 | Chen | B23D 51/10 279/97 |

* cited by examiner

*Primary Examiner* — Stephen Choi
(74) *Attorney, Agent, or Firm* — Pro-TECHTOR International Services; Ian Oglesby (57) ABSTRACT

A saw blade hand tool structure includes a handle, an internal insert plate installed in the handle, an assembly head installed at an end of the handle and having an accommodating space with an abutting slope, an elastic element installed between the assembly head and the handle, a tightening assembly formed by a plate, a spring, a displacing member and locking pins, and a saw blade. A recess is formed on the plate which is installed in the assembly head; the locking pin is secured with the internal insert plate; the spring is sheathed on the displacing member which passes into the through hole of the internal insert plate; the displacing member is abutted by the abutting slope of the assembly head; and the saw blade is inserted into the assembly head and positioned by an end of the displacing member to prevent the saw blade from falling out.

4 Claims, 8 Drawing Sheets

SAW BLADE HAND TOOL STRUCTURE

FIELD OF INVENTION

The present invention relates to a saw blade hand tool structure, in particular to a saw blade hand tool with a better buffering function.

BACKGROUND OF INVENTION

1. Description of the Related Art

As disclosed in R.O.C. Pat. No. 542074, a composite hand tool structure comprises a handle, a quick-release socket set and a plurality of hand tool heads of different lengths installable to the front end of the handle, and a saw blade. The quick-release socket set are provided for sheathing on various hand tool heads as well as inserting a saw blade to fix a locking rod in order to connect and secure a saw blade.

Although these structures may serve as a hand tool for changing the tool heads and also serve as an auxiliary tool when an electric saw breaks down or during a power failure. However, these structures have a complicated structure and are difficult to assemble. When the saw blade is used to saw an object, the saw blade and the hand tool generally do not come with any buffering design, so that it is easy to break or crack the saw blade, and the hands of the users may be injured easily by the vibration produced during the operation. Obviously, the conventional structure has many drawbacks and requires improvements.

2. Summary of the Invention

Therefore, it is a primary objective of the present invention to provide a saw blade hand tool structure with the advantages of sample structure, quick installation, and convenient application.

Another objective of the present invention is to provide a saw blade hand tool structure with a better buffering function, not just preventing the saw blade from cracking or breaking easily, but also reducing the vibration of the saw blade to prevent possible injuries to the users' hands.

To achieve the aforementioned and other objectives, the present invention provides a saw blade hand tool structure, comprising:

a handle, having a containing slot formed therein;

an internal insert plate, installed in the containing slot, and having a through hole formed at a predetermined position of the internal insert plate;

an assembly head, installed at an end of the handle, and having an accommodating space, and an abutting slope disposed at a predetermined position of the accommodating space;

an elastic element, installed between the assembly head and the handle;

a tightening assembly, comprised of a plate, a spring, a displacing member and a plurality of locking pins, a recess being formed on a side of the plate, and the plate being installed in the accommodating space of the assembly head, and each locking pin being used for locking the internal insert plate securely, and the spring being sheathed on the external periphery of the displacing member, and the displacing member passing into the through hole of the internal insert plate, and the displacing member being abutted by the abutting slope of the assembly head; and a saw blade, inserted into the assembly head, and passing through and being positioned at an end of the displacing member to prevent the saw blade from falling out.

The saw blade hand tool structure further comprises a screw assembly comprised of a bolt and a nut, and a penetrating hole is formed at a predetermined position of the screw assembly and the handle separately, and the internal insert plate has a through hole formed at a position relative to the penetrating hole, and the penetrating hole of the handle and the through hole of the internal insert plate are provided for passing through the bolt and locking and positioning the nut at the penetrating hole of the handle.

The saw blade hand tool structure further comprises an auxiliary blade, the auxiliary blade attached to a side of the saw blade, and an end of the auxiliary blade being installed and fixed to the recess of the plate.

Wherein, the elastic element is a spring.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
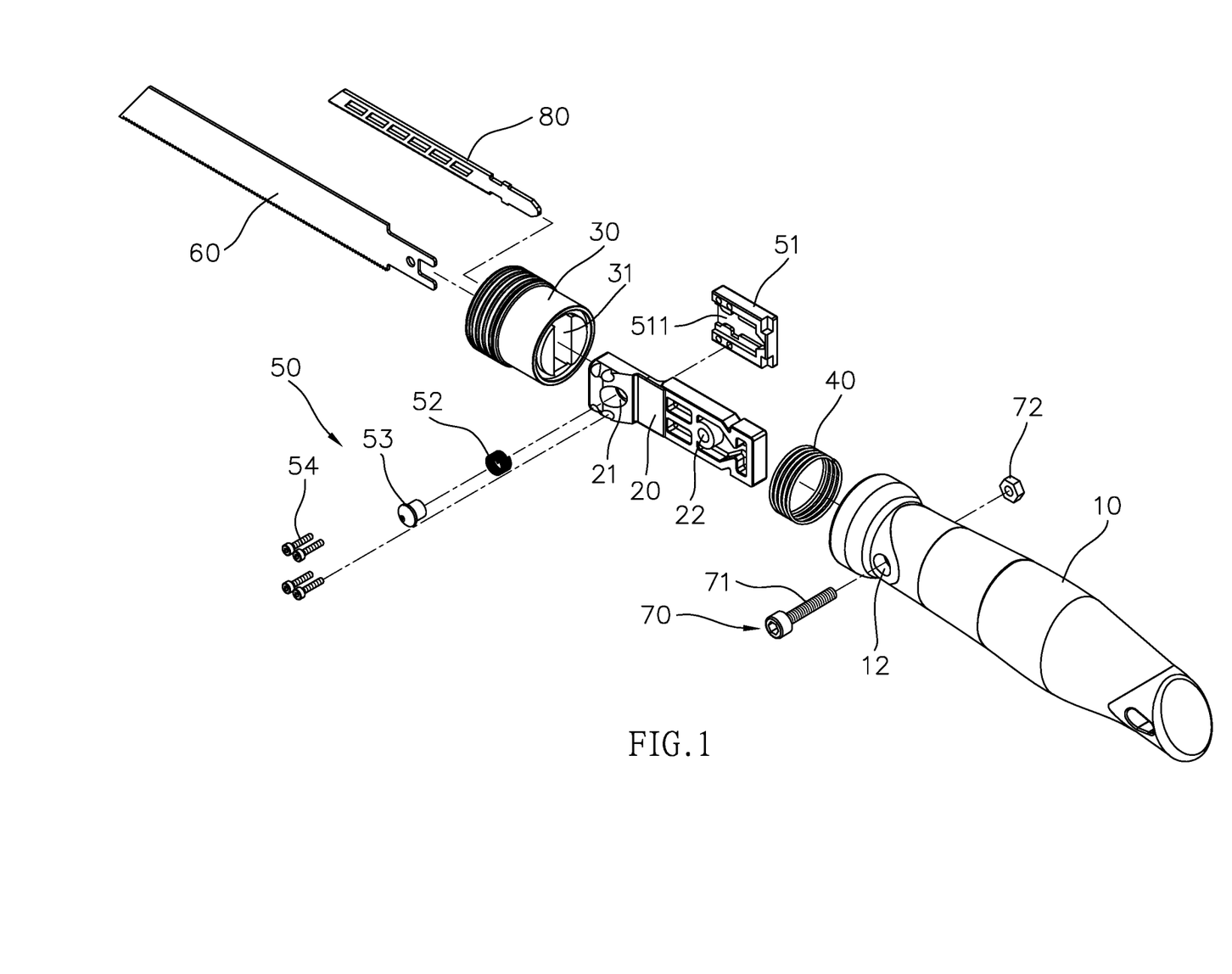
FIG. 1 is an exploded view of the present invention.
Figure 2:
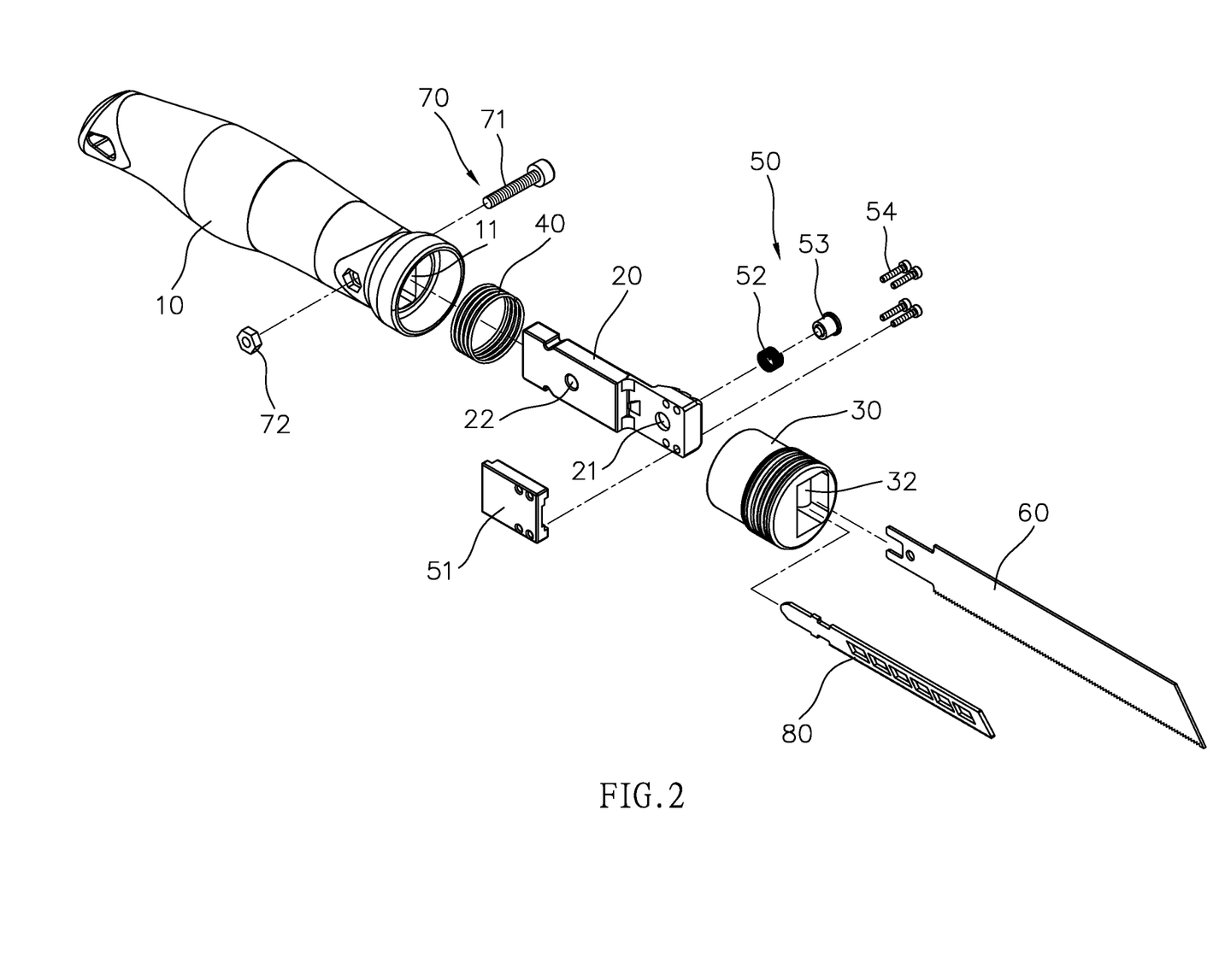
FIG. 2 is another exploded view of the present invention.
Figure 3:
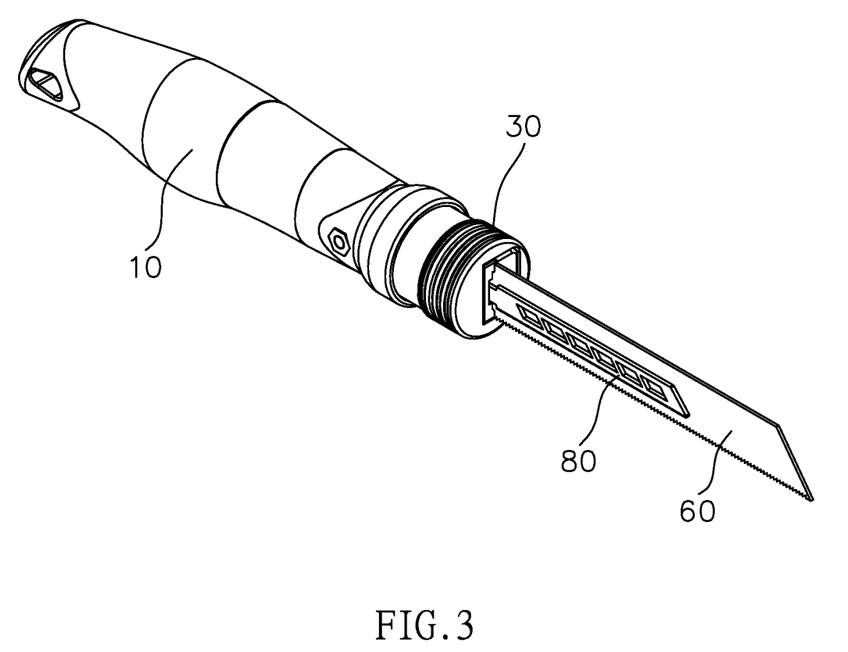
FIG. 3 is a perspective view of the present invention.
Figure 4:
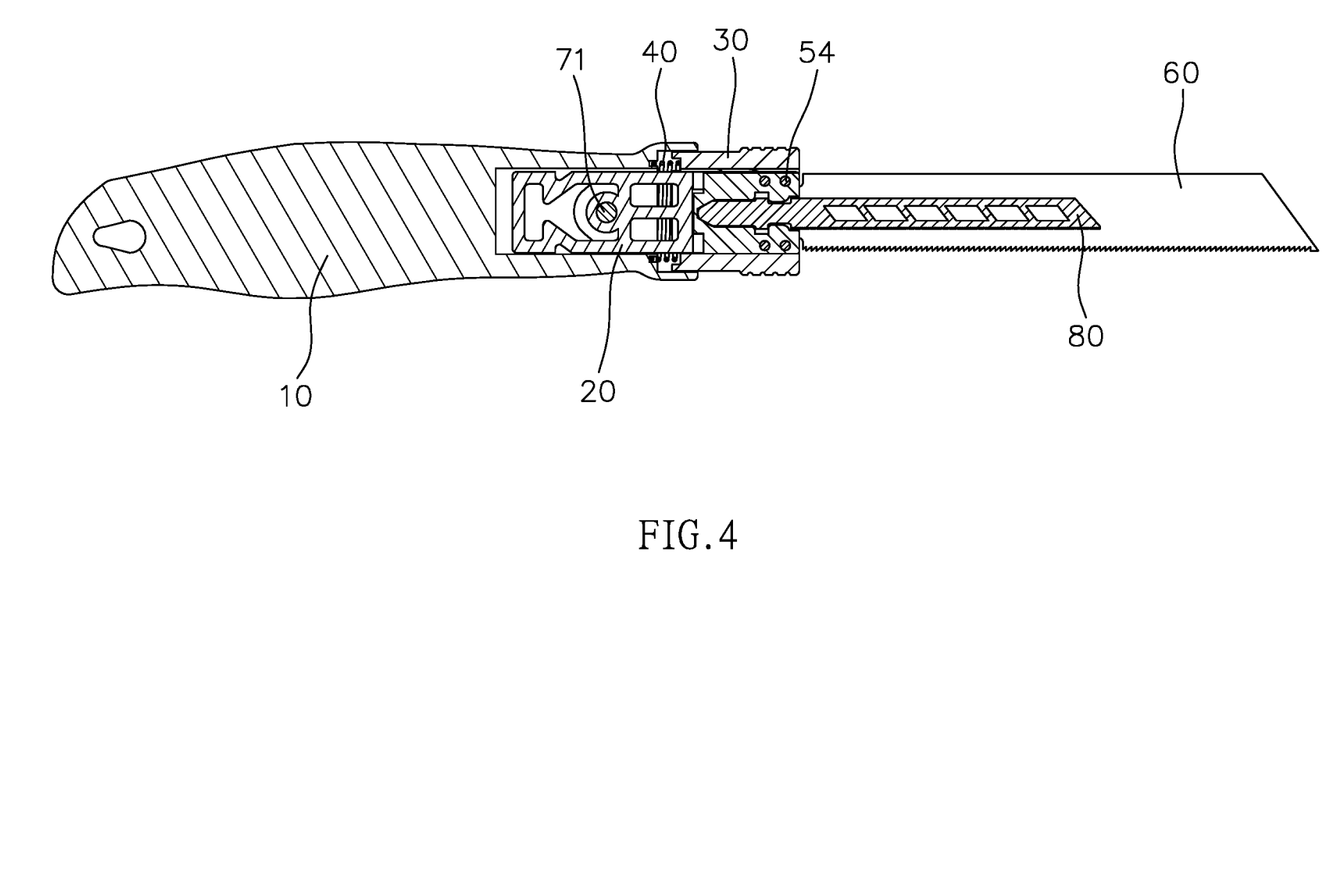
FIG. 4 is a cross-sectional view of the present invention.
Figure 5:
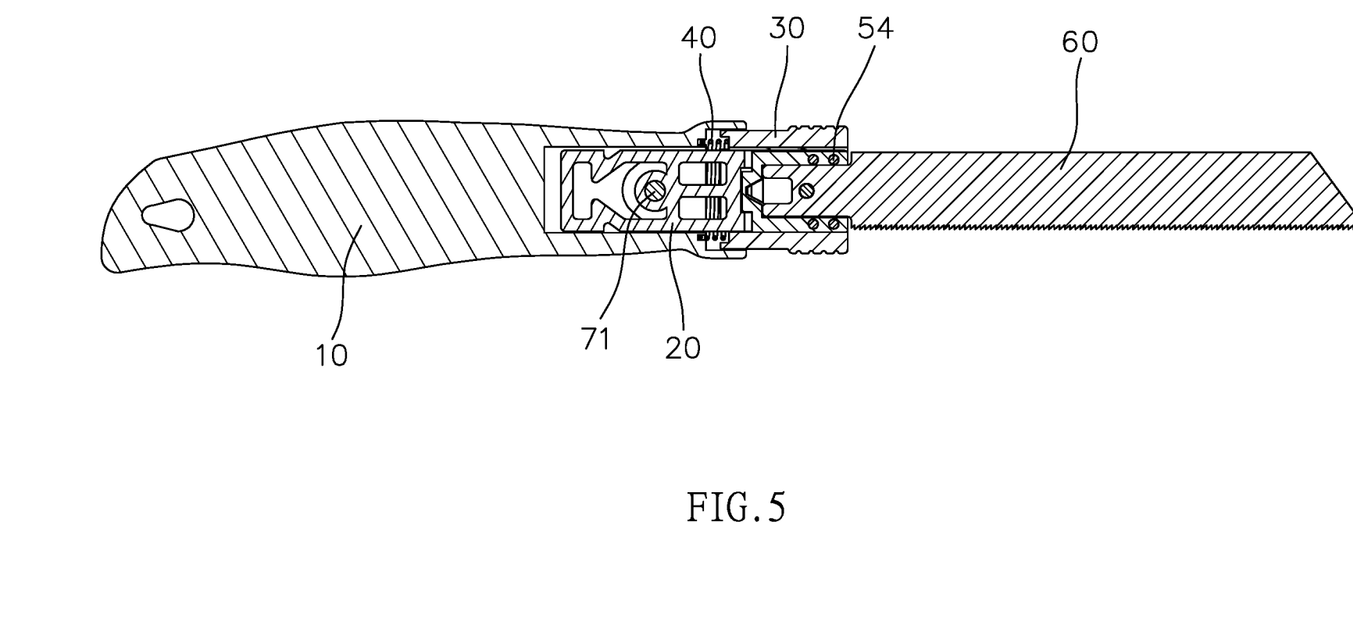
FIG. 5 is another cross-sectional view of the present invention.
Figure 6:
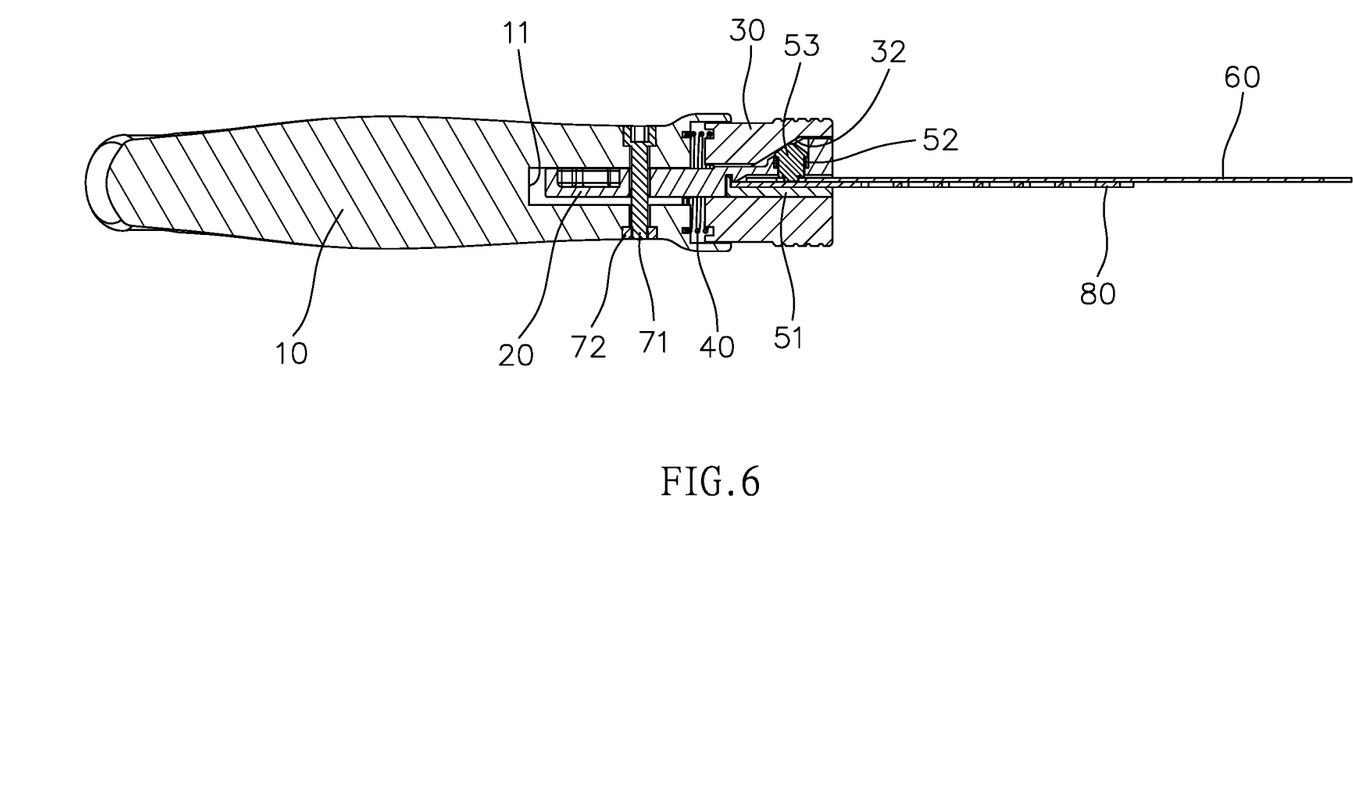
FIG. 6 is a further cross-sectional view of the present invention.
Figure 7:
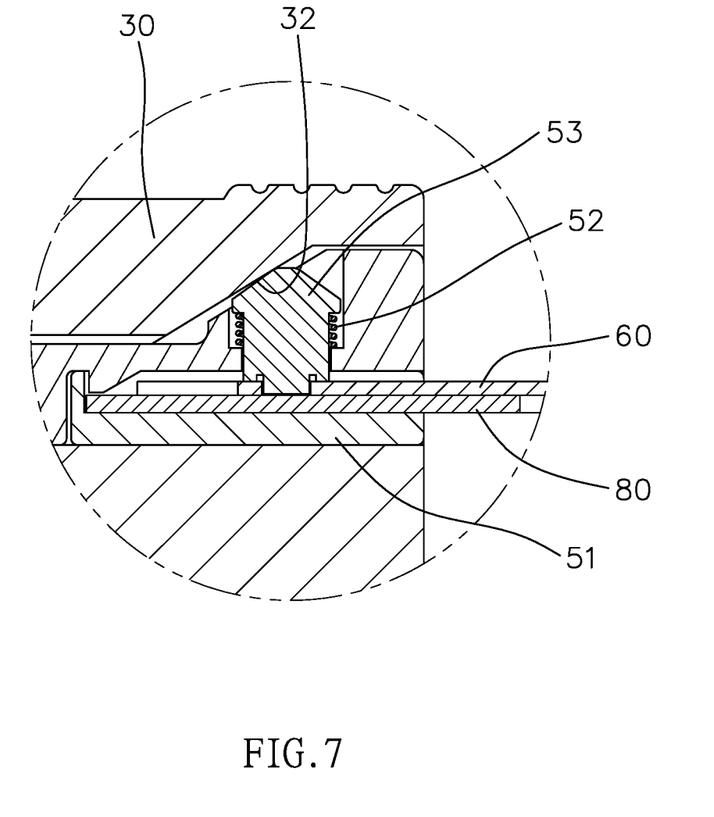
FIG. 7 is a blowup view of a selected portion of FIG. 6.
Figure 8:
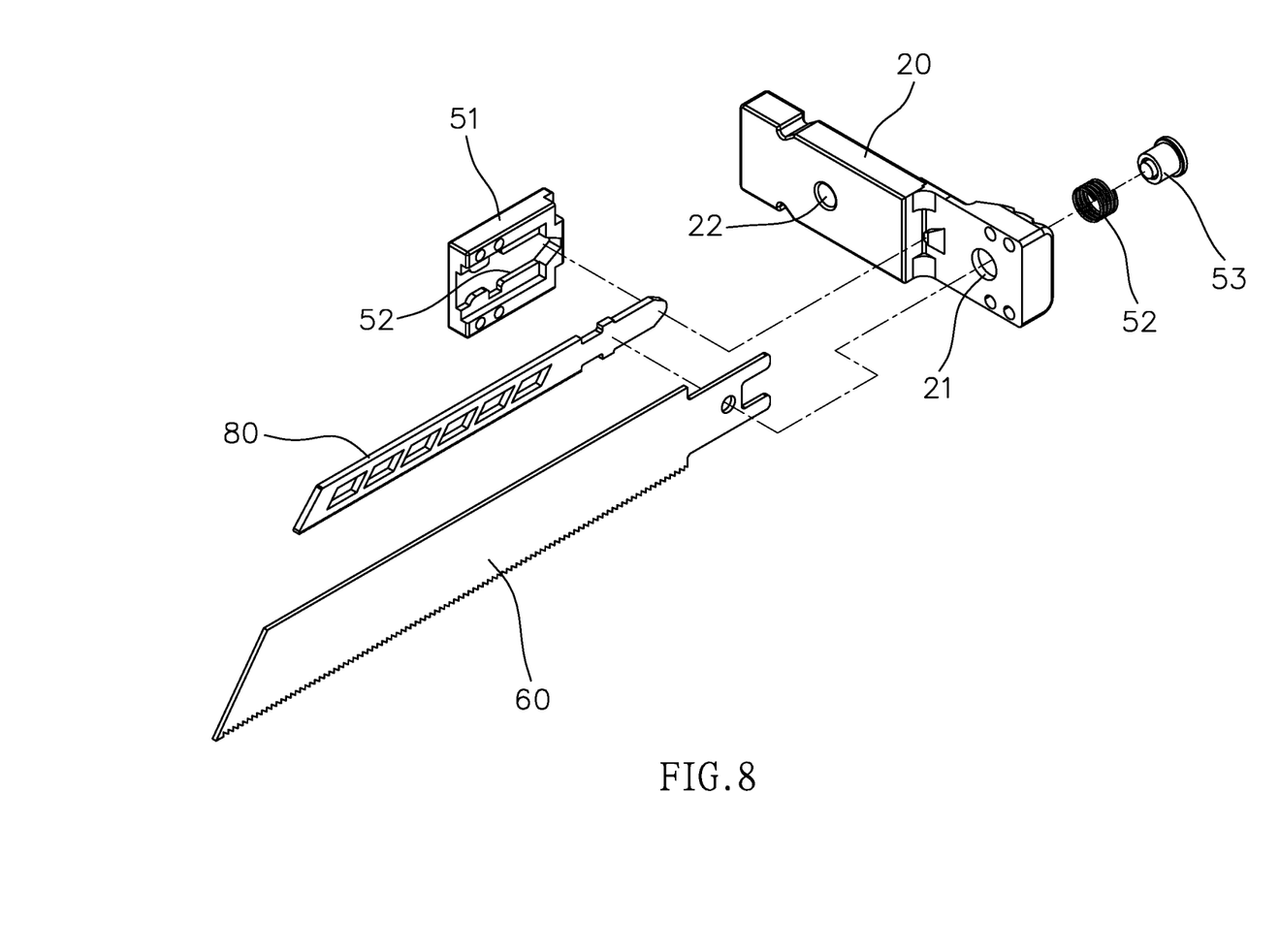
FIG. 8 is an exploded view of some components of the present invention.

With reference to FIGS. 1 to 8 for a saw blade hand tool structure of the present invention, the saw blade hand tool structure comprises:

a handle 10, having a containing slot 11 formed therein;

an internal insert plate 20, installed in the containing slot 11, and having a through hole 21 formed at a predetermined position of the internal insert plate 20;

an assembly head 30, installed to an end of the handle 10, and having an accommodating space 31, and an abutting slope 32 formed at a predetermined position of the accommodating space 31;

an elastic element 40, installed between the assembly head 30 and the handle 10;

a tightening assembly 50, comprised of a plate 51, a spring 52, a displacing member 53 and a plurality of locking pins 54, and a recess 511 being formed on a side of the plate 51, and the plate 51 being installed in the accommodating space 31 of the assembly head 30, and each locking pin 54 being locked and fixed to the internal insert plate 20, and the spring 52 being sheathed on the outer periphery of the displacing member 53, and the displacing member 53 passing into the through hole 21 of the internal insert plate 20, and the displacing member 53 being pushed and abutted by the abutting slope 32 of the assembly head 30; and a saw blade 60, inserted into the assembly head 30, and positioned by an end of the displacing member 53 to prevent the saw blade 60 from falling out.

The saw blade hand tool structure further comprises a screw assembly 70 comprised of a bolt 71 and a nut 72, and a penetrating hole 12 is formed at a predetermined position of the handle 10, and the internal insert plate 20 has a through hole 22 formed at a position relative to the penetrating hole 12, and the penetrating hole 12 of the handle 10 and the through hole 22 of the internal insert plate 20 are provided for passing through the bolt 71, and the nut 72 is provided for locking and positioning at the penetrating hole 12 of the handle 10.

The saw blade hand tool structure further comprises an auxiliary blade 80 attached to a side of the saw blade 60, and a recess 511 is formed at an end of the auxiliary blade 80 for installing and fixing the plate 51.

Wherein, the elastic element 40 is a spring.

In FIGS. 1 to 8, the aforementioned assembly of the present invention has a simple overall structure. After the internal insert plate 20, the assembly head 30, the elastic element 40, the tightening assembly 50 and the saw blade 60 are assembled, the whole structure can be installed into the handle 10 easily to achieve the effects of quick installation, and convenient and practical application.

In addition, an elastic element 40 is installed between the handle 10 and the assembly head 30, so that when a user uses the saw blade 60 of the present invention to saw an object (not shown in the figures), the assembly head 30 will be linked to push and press the elastic element 40. The invention provides a buffering function, not just preventing the saw blade 60 from cracking or breaking easily, but also preventing the users' hands from being injured by the vibrations produced during the operation of the saw blade 60. The invention has the features of high safety, simple and easy operation, convenient carry, and practical application.

What is claimed is:

1. A saw blade hand tool structure, comprising:
   a handle, having a containing slot formed therein;
   an internal insert plate, installed in the containing slot, and having a through hole formed at a predetermined position of the internal insert plate;
   an assembly head, installed at an end of the handle, and having an accommodating space, and an abutting slope disposed at a predetermined position of the accommodating space;
   an elastic element, installed between the assembly head and the handle;
   a tightening assembly, comprised of a plate, a spring, a displacing member and a plurality of locking pins, a recess being formed on a side of the plate, and the plate being installed in the accommodating space of the assembly head, and each locking pin being used for locking the internal insert plate securely, and the spring being sheathed on the external periphery of the displacing member, and the displacing member passing into the through hole of the internal insert plate, and the displacing member being abutted by the abutting slope of the assembly head; and
   a saw blade, inserted into the assembly head, and passing through and being positioned at an end of the displacing member to prevent the saw blade from falling out.

2. The saw blade hand tool structure of claim 1, further comprising a screw assembly comprised of a bolt and a nut, and a penetrating hole being formed at a predetermined position of the screw assembly and the handle separately, and the internal insert plate having a through hole formed at a position relative to the penetrating hole, and the penetrating hole of the handle and the through hole of the internal insert plate being provided for passing through the bolt, and locking and positioning the nut at the penetrating hole of the handle.

3. The saw blade hand tool structure of claim 1, further comprising an auxiliary blade attached to a side of the saw blade, and an end of the auxiliary blade being installed and fixed to the recess of the plate.

4. The saw blade hand tool structure of claim 1, wherein the elastic element is a spring.

* * * * *